Feb. 3, 1959     K. J. KALLENBERG ET AL     2,872,585
DEVICE FOR RAPIDLY MAKING X-RAY PICTURES
Filed July 5, 1955     8 Sheets-Sheet 1
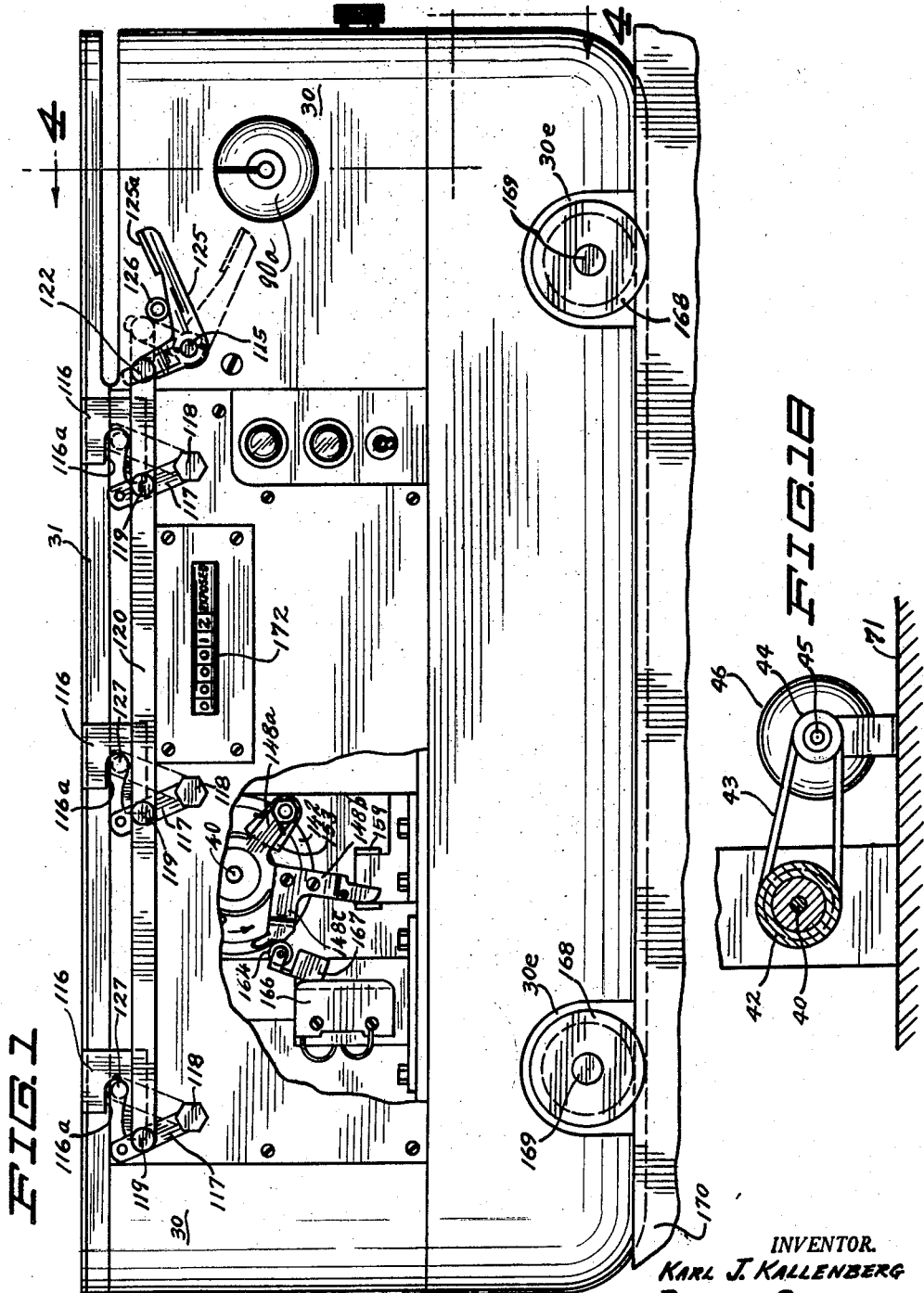
INVENTOR.
KARL J. KALLENBERG
ROBERT SARDESON
BY
ATTORNEY

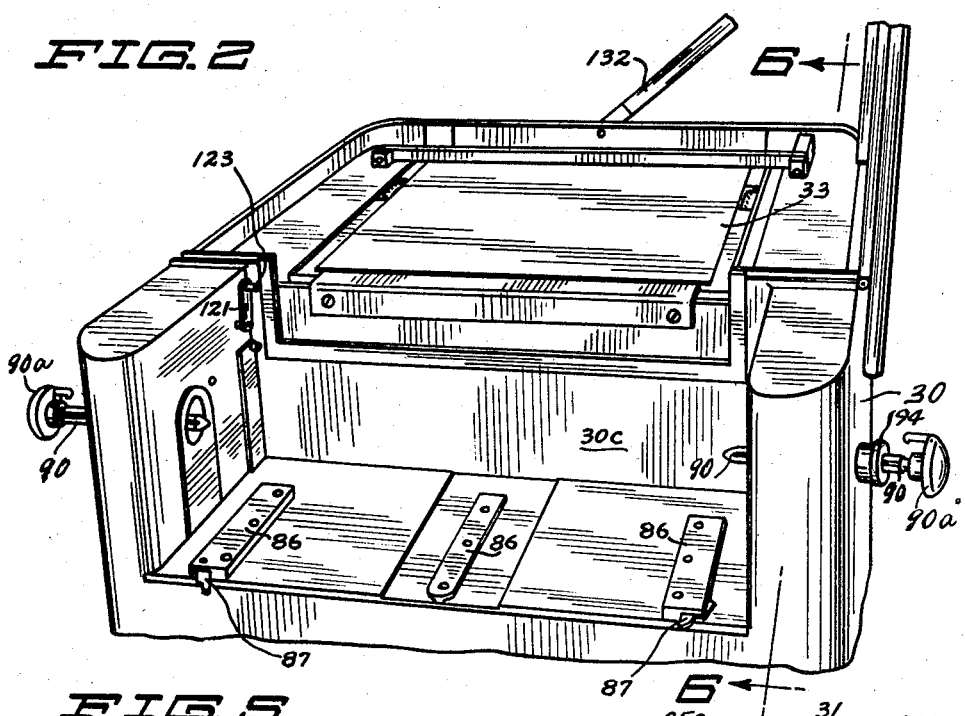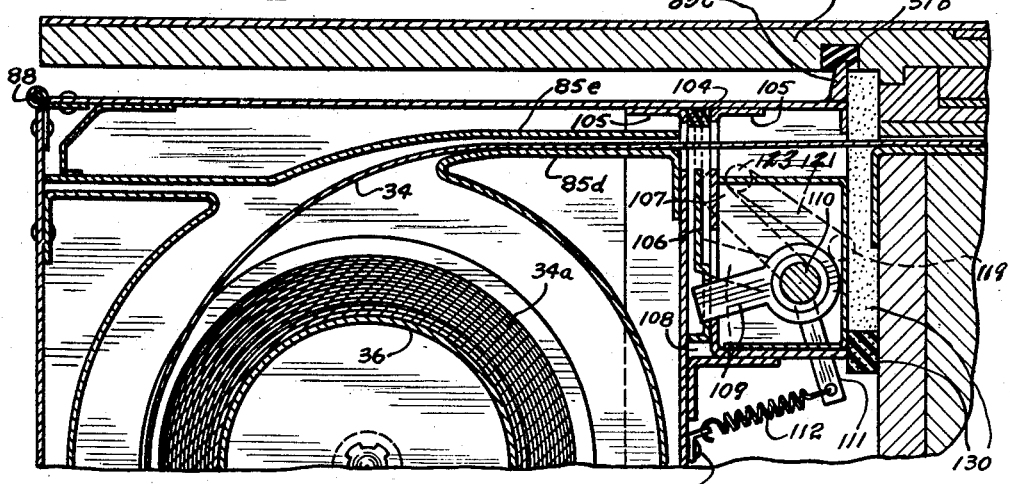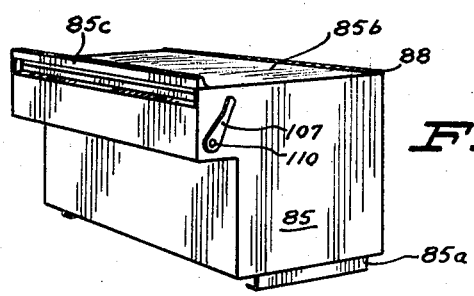

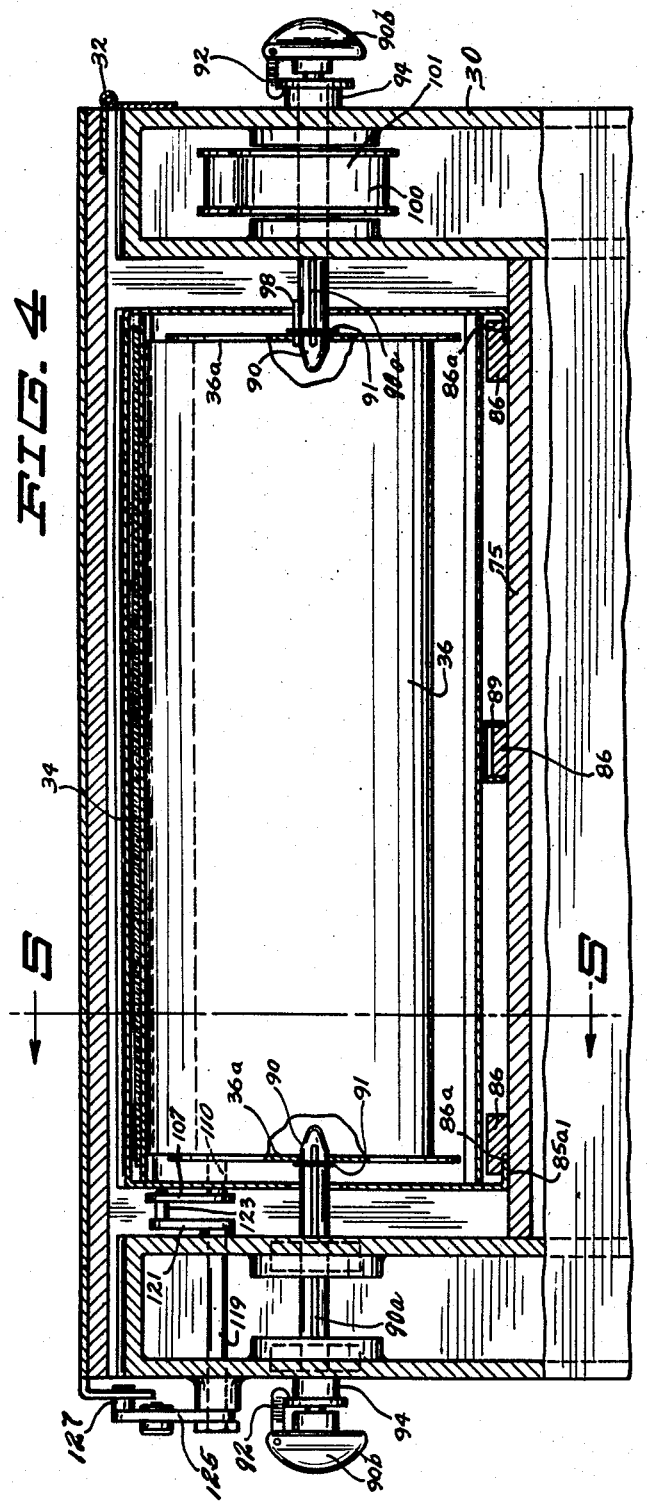

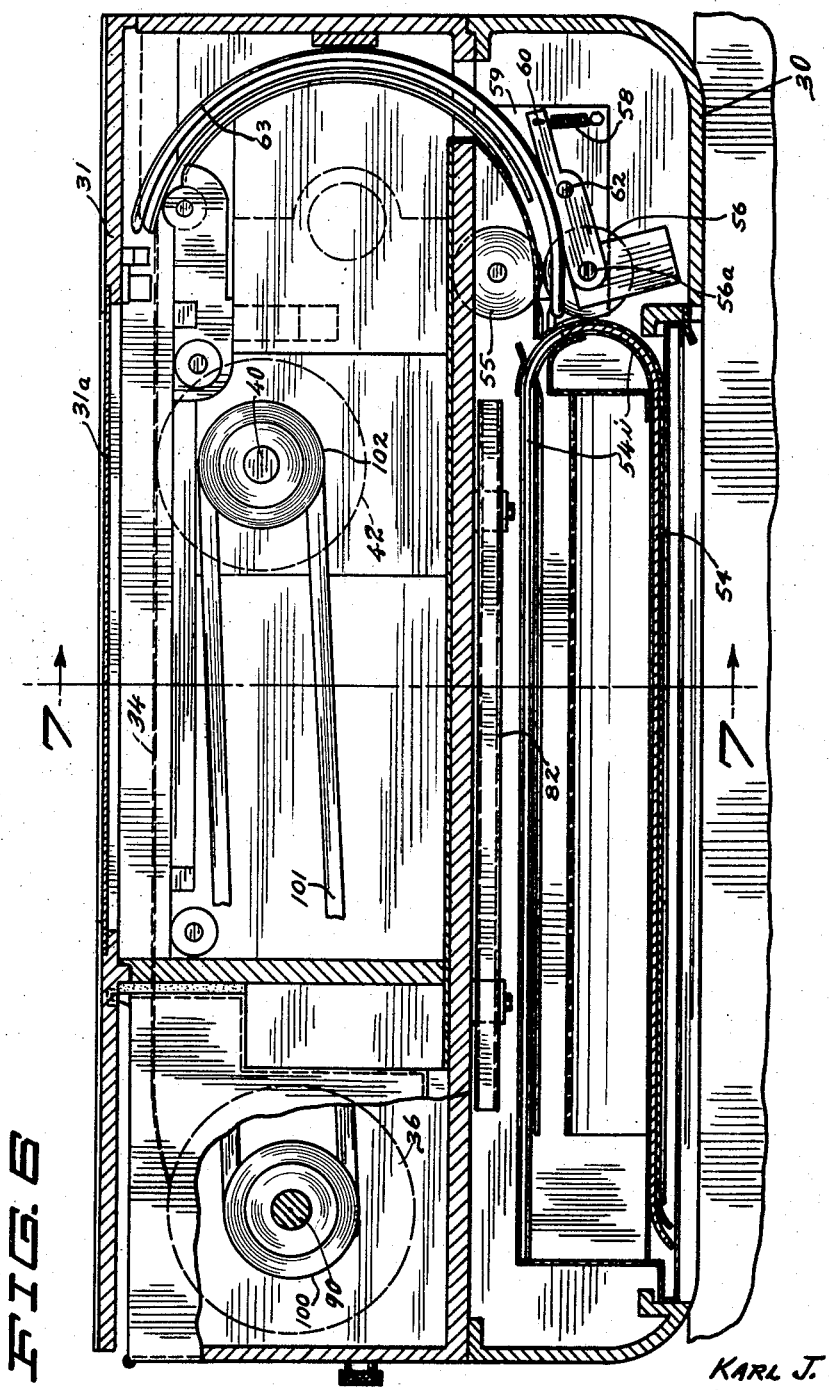

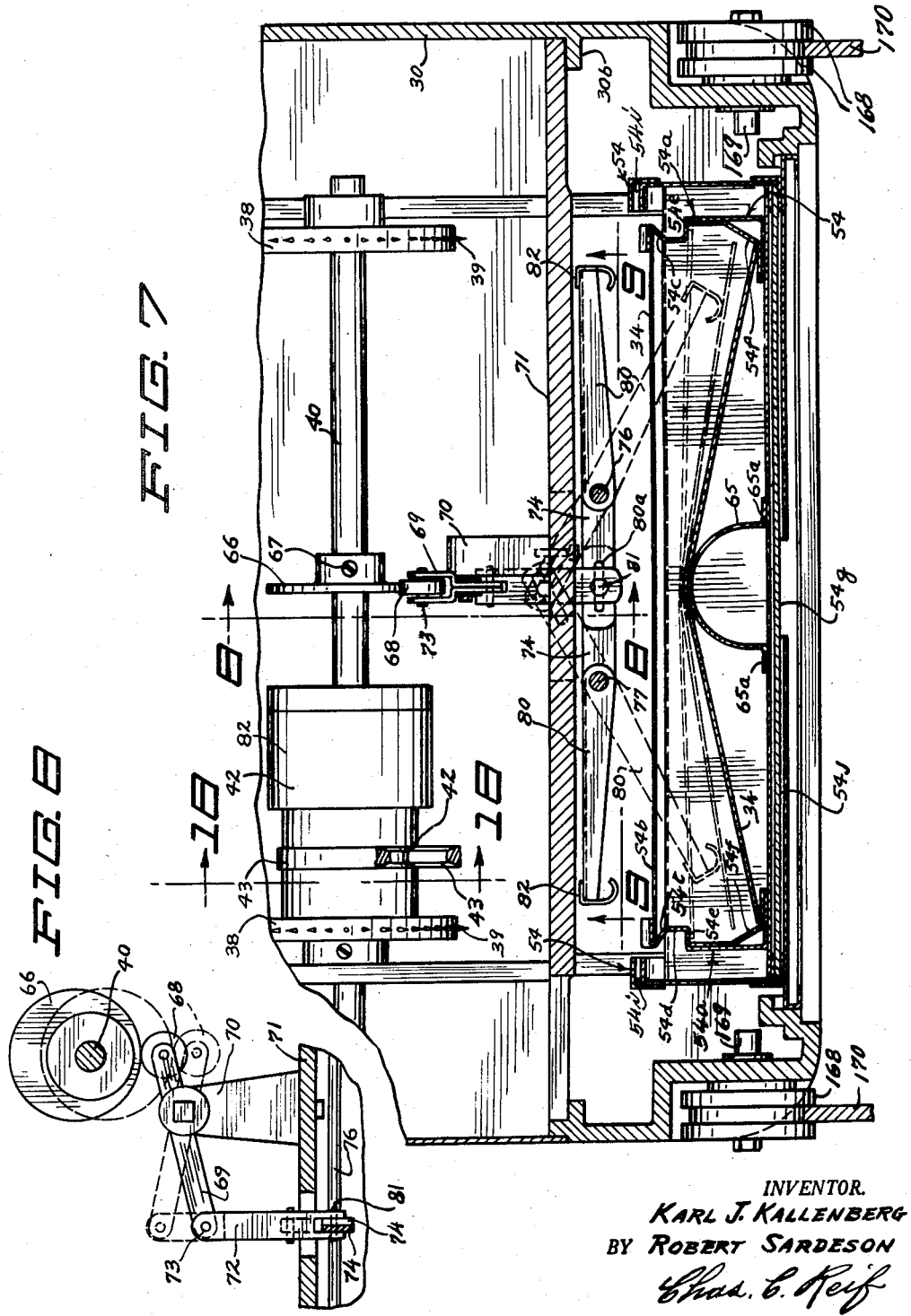

Feb. 3, 1959  K. J. KALLENBERG ET AL  2,872,585
DEVICE FOR RAPIDLY MAKING X-RAY PICTURES
Filed July 5, 1955  8 Sheets-Sheet 6
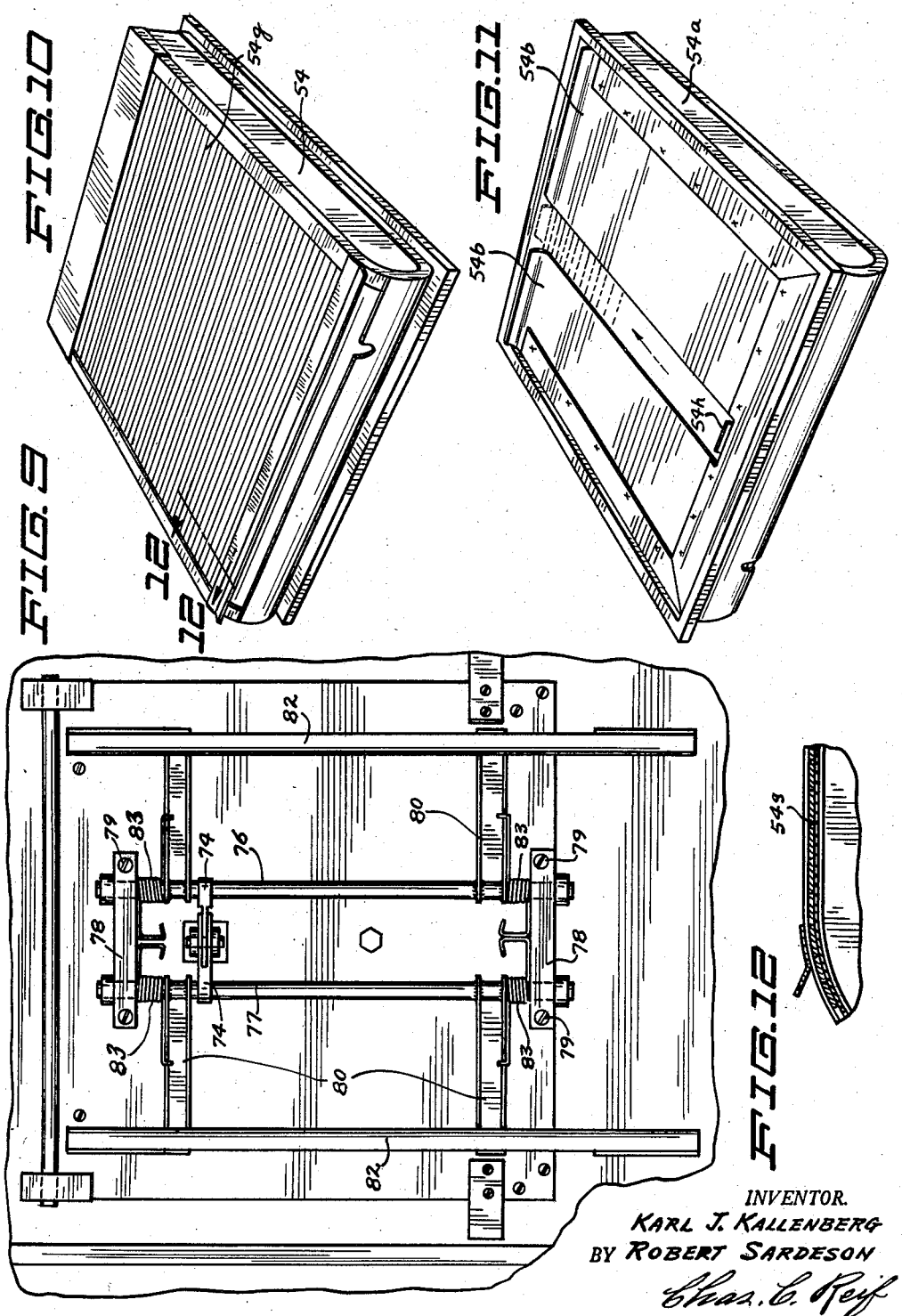
INVENTOR.
KARL J. KALLENBERG
BY ROBERT SARDESON
ATTORNEY

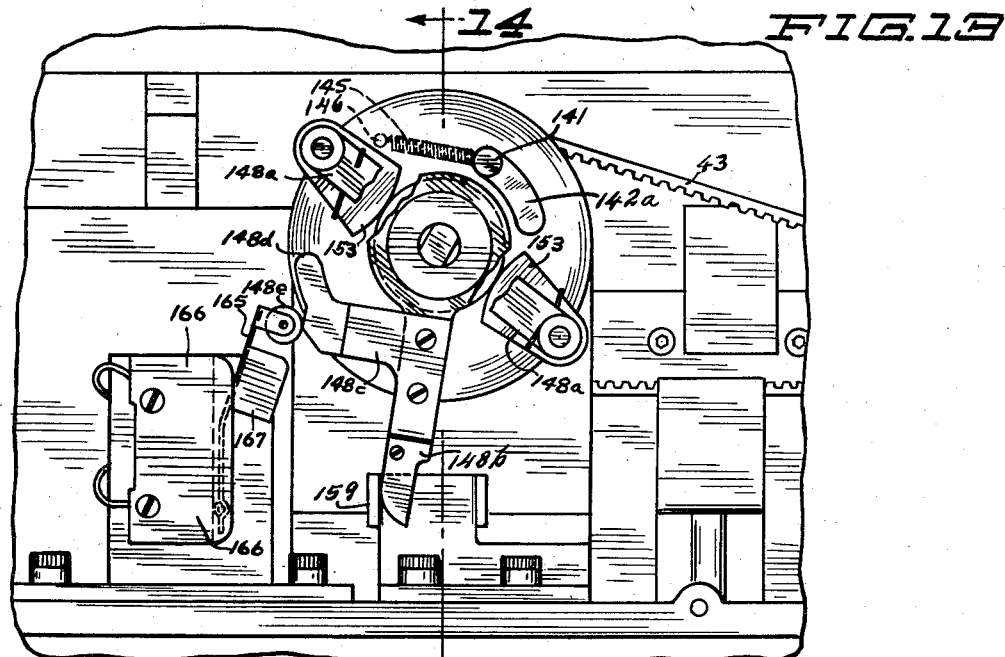
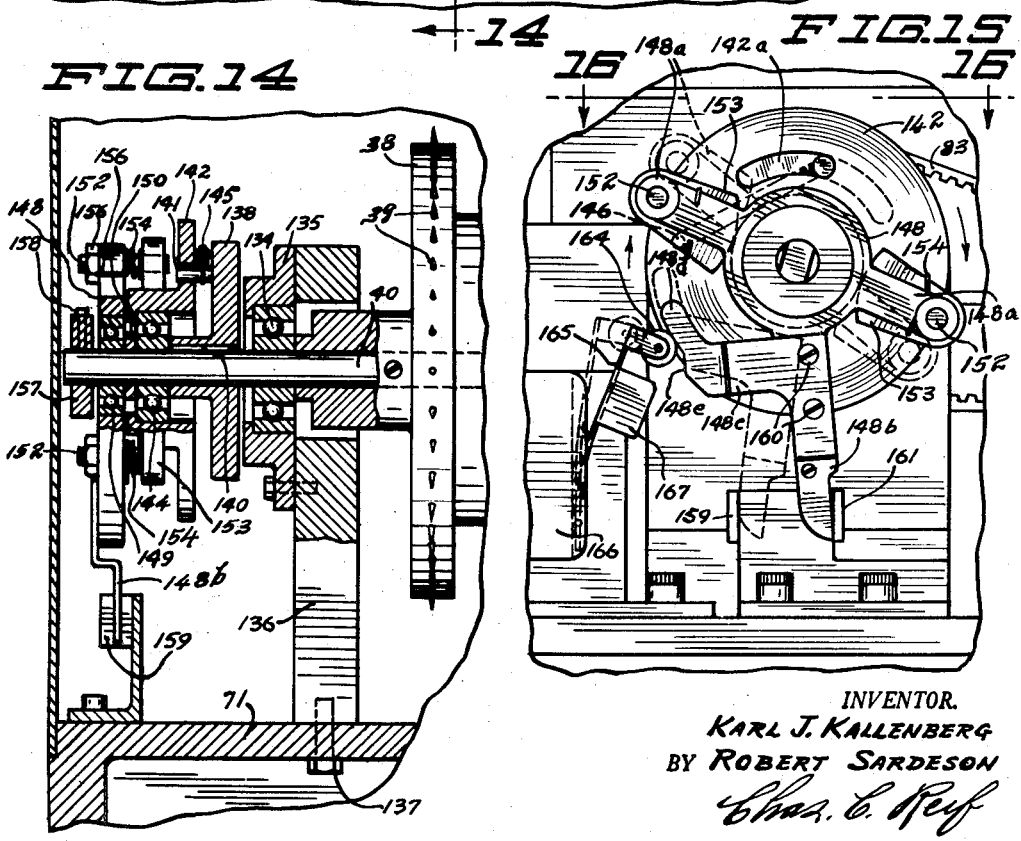

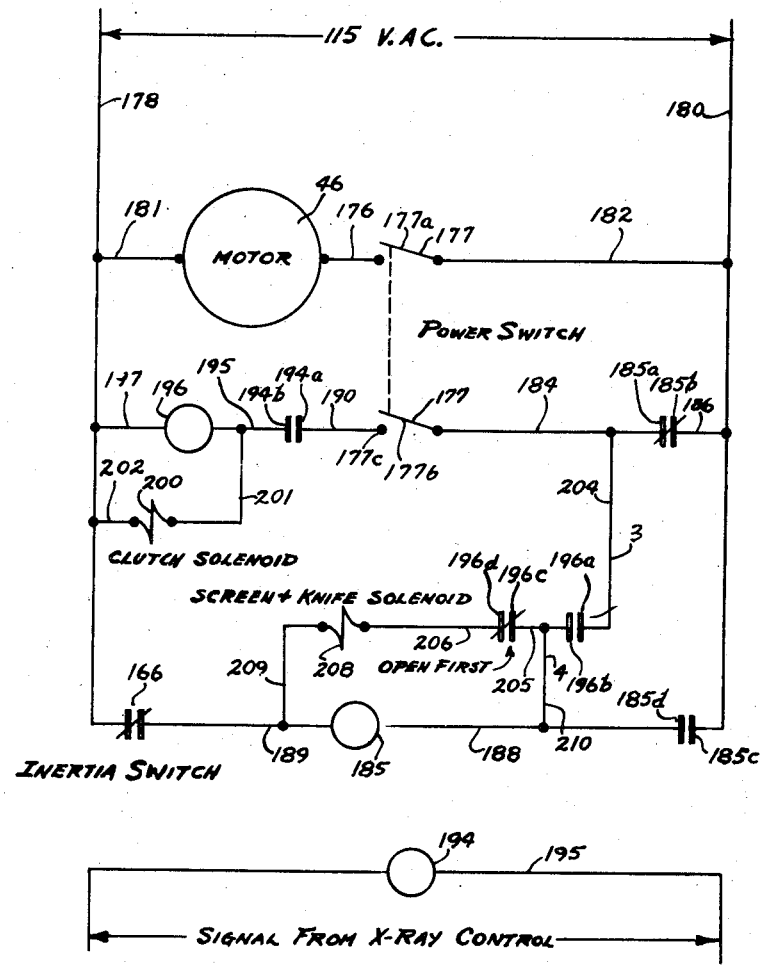

United States Patent Office 2,872,585
Patented Feb. 3, 1959

2,872,585

DEVICE FOR RAPIDLY MAKING
X-RAY PICTURES

Karl J. Kallenberg and Robert Sardeson, Minneapolis, Minn., assignors to Pako Corporation, Minneapolis, Minn., a corporation of Delaware Application July 5, 1955, Serial No. 519,794

20 Claims. (Cl. 250—66)

This invention relates to a device used in connection with an X-ray apparatus for rapidly making X-ray pictures. While the machine is capable of many and various applications, it is particularly designed to be used in medical work, as in hospitals. It is desirable in a modern hospital to have facilities for very quickly taking X-ray pictures of injured persons, including persons who have brain injuries, so that a diagnosis may be made as quickly as possible to determine subsequent procedure. It might be stated that in taking X-rays of the brain an opaque fluid is injected into an artery leading to the brain and this fluid diffuses through the smaller blood vessels of the brain so that quite a good picture can be obtained.

This invention is directed to improvements made upon and in connection with the device disclosed and claimed in the application of Karl J. Kallenberg and Robert Sardeson, filed February 21, 1952, Serial No. 272,806, now U. S. Patent No. 2,831,979, granted April 22, 1958.

In the operation of the device of this invention a continuous film is used and portions which have been exposed are subsequently severed and the severed portions moved into a receptacle.

It is an object of this invention to provide means for depressing the end or side portions of the films when received in said receptacle so that said end or side portions may be positioned below suitable holding means.

It is another object of the invention to provide a receptacle as set forth in the preceding paragraph, said receptacle having ledges at its opposite portions, means being provided to depress the said portions of the films below said ledges so that said portions will move into position below said ledges and be held thereby.

It is also an object of the invention to provide such a device as set forth in the preceding paragraphs, together with a member upstanding from the bottom of said receptacle substantially at the central portion thereof, said member having a top surface over which the films are bent as their opposite portions are depressed, said top surface preferably being of concave substantially cylindrical form.

It is a further object of the invention to provide such a device as above set forth, the same comprising a casing having therein an exposable chamber, a film magazine comprising a second casing receivable in said chamber, means for supporting a roll of film in said magazine, and means for causing rotation of said roll.

It is another object of the invention to provide such a device as set forth in the preceding paragraph, said first mentioned casing having a top cover movable to closed position having a slot extending transversely in its lower side, said second casing having a rib on its top adapted to extend into said slot when said cover is moved to closed position to form a light seal.

It is also an object of this invention to provide a device as set forth in the two previous paragraphs, said second casing having an opening through which the film is dispensed, a light seal for said opening, means for locking said cover in closed position, and a second means for opening said light seal actuated when said first mentioned means is operated.

It is still another object of this invention to provide a machine in which a continuous film is successively moved to bring portions thereof into exposure position, means for moving said film, a shaft for driving said means, means for abruptly stopping the rotation of said shaft when the film has been properly positioned, a switch having an operating portion and a member moved by inertia when rotation of said shaft is stopped, and means actuated by said member adapted to strike said switch for momentarily operating the same, and means for returning said switch to normal position.

It is another object of this invention to provide means for successively moving a continuous film to bring portions thereof into exposure position, a shaft for driving said means, means for stopping said shaft, a member carried by said shaft, a switch, and means actuated by overrunning of said member when said shaft is stopped for momentarily operating said switch.

It is also an object of this invention to provide means for successively moving a continuous film to bring portions thereof into exposure position, a shaft for driving said means, a member secured to said shaft, a second member journaled on said shaft and connected to said member so as to be driven thereby, said second member having rotative movement relative to said first mentioned member, a third member moved by said second member, a switch having an operating portion, means for stopping the rotation of said shaft, said second member being constructed to overrun and be returned when said shaft is stopped whereby said third member in the return movement will strike said operating portion and momentarily operate said switch, and means for returning said switch to normal position.

It is a further object of this invention to provide a device for rapidly taking X-ray pictures, said device having means for successively progressing a continuous film, and means for severing the exposed portion thereof, and a novel form of receptacle into which said severed portion is moved.

These and other objects and advantages of the invention will be fully set forth in the following description made in connection with the accompanying drawings in which like reference characters refer to similar parts throughout the several views and in which:

Fig. 1 is a view in side elevation of the device with some parts broken away;

Fig. 2 is a partial perspective view of a portion of the machine looking downwardly on one end portion thereof;

Fig. 3 is a perspective view of a film magazine;

Fig. 4 is a vertical section taken substantially on line 4—4 of Fig. 1, as indicated by the arrows;

Fig. 5 is a partial vertical section taken on line 5—5 of Fig. 4, as indicated by the arrows;

Fig. 6 is a vertical section taken substantially on line 6—6 of Fig. 2, as indicated by the arrows;

Fig. 7 is a partial vertical section taken on line 7—7 of Fig. 6;

Fig. 8 is a partial vertical section taken substantially on line 8—8 of Fig. 7, as indicated by the arrows;

Fig. 9 is a horizontal section taken substantially on line 9—9 of Fig. 7, as indicated by the arrows;

Fig. 10 is a perspective view of a film-receiving receptacle used;

Fig. 11 is a view similar to Fig. 10 showing parts of said receptacle in different positions;

Fig. 12 is a small partial vertical section taken on line 12—12 of Fig. 10, as indicated by the arrows;

Fig. 13 is a partial view in side elevation of a switch operating mechanism used;

Fig. 14 is a partial vertical section taken on line 14—14 of Fig. 13, as indicated by the arrows;

Fig. 15 is a view similar to Fig. 13 showing the parts in different positions;

Fig. 16 is a partial top plan view of some of the parts shown in Fig. 14, as seen from line 16—16 of Fig. 15;

Fig. 17 is a wiring diagram used with the device; and

Fig. 18 is a somewhat diagrammatic vertical section taken substantially on line 18—18 of Fig. 7.

Referring to the drawings, the device comprises a casing 30 of general parallelepiped form having rounded lower front and rear corners, as shown in Fig. 6. Casing 30 has a top cover or lid 31, which cover is hinged along one side of said casing by a hinge 32, as shown in Fig. 4. The film 34 moves along a suitable supporting member or plate 35 passing between a pair of screens as shown and described in said prior application. One of said screens is shown as 33 in Fig. 2. A continuous film is used and the same is dispensed from a roll 34a carried on a drum 36, as shown in Fig. 5. The film is intermittently progressed to bring a portion thereof into exposure position and beneath the plate 31a in cover 31. Said film is progressed by a pair of wheels 38 having projecting from their peripheries a multiplicity of pointed pins 39. Wheels 38 are secured to a drifting shaft 40. Shaft 40 is concentric with a drum 42 which is constantly driven by a belt 43 running thereover and over a pulley 44, secured to a shaft 45 of an electric motor 46 suitably supported on member 71. Drum 42 is continuously driven and said drum comprises a clutch for connecting shaft 40 thereto and disconnecting shaft 40 therefrom. A brake is also provided in drum 42 for stopping the rotation of shaft 40 when released from drum 42. Said clutch and brake are clearly shown in said prior application and form no part of the present invention. In the said prior application the shaft corresponding to shaft 40 is numbered 92 and the drum corresponding to drum 42 is numbered 82. The film portion exposed is moved after said exposure and the exposed portion severed, as fully set forth in said prior application, and the exposed portion is moved into a receptacle 54 by a pair of rollers 55 and 56. Roller 56 is urged to have its periphery moved toward the periphery of roller 55 by a coiled tensile spring 58 having one end secured to a plate 59 secured in casing 30 and its other end secured to one end of a lever 60 pivoted intermediate its ends on a pivot 62. The trunnion 56a of roller 56 extends through lever 60. The film is guided from its exposure position to the entrance of receptacle 54 by a plurality of curved transversely spaced guide members 63 formed of comparatively small rods or wires.

Receptacle 54 is shown in transverse vertical cross section in Fig. 7. Receptacle 54 has spaced vertical partition-like portions 54a. Said portions 54a have downwardly and inwardly extending portions 54c from the lower ends of which substantially vertical portions 54d extend downwardly to substantially horizontal portions 54e extending outwardly. Said portions then extend vertically downward from portions 54e, the same having lower portions 54f inclined downwardly and inwardly. It will be seen that portions 54e form ledges. A member 65 shown as made of sheet material is supported upon the bottom of receptacle 54, the same being illustrated as of substantially semi-cylindrical form and having outwardly extending flanges 65a secured to the bottom of receptacle 54 in any suitable manner, as by welding. A disk 66 has a hub portion secured to shaft 40 in any suitable manner, as by set screw 67. The periphery of disk 66 is eccentric to shaft 40 and the same forms a rotatable cam, the periphery of which engages a roller 68 rotatably carried in the bifurcated end of a lever 69 fulcrumed between its ends in a bracket 70 supported upon plate 71 extending across casing 30 and supported upon projections 30b of the wall of said casing. The other end of lever 69 is pivotally connected to a bar 72. The upper end of bar 72 is bifurcated to receive the end of lever 69 and said parts are connected by the pivot 73 extending therethrough. The lower end of bar 72 is bifurcated and receives therein the flattened ends of a pair of arms 74. A headed pivot bolt 81 extends through elongated slots 80a in arms 74 and through bar 72. Arms 74 have hubs at their other ends secured respectively to a pair of shafts 76 and 77 which are journaled in bearings 78 secured to plate 71 by screws 79. Shafts 76 and 77 have secured thereto respectively pairs of arms 80 extending in opposite directions from shafts 76 and 77 and having their other ends secured to bars 82. Bars 82 are semi-tubular in form, as shown in Fig. 7, and have lower substantially semi-cylindrical portions with convexly curved surfaces. A torsion spring 83 surrounds each of shafts 76 and 77 between the arms 80 and the bearings 78. The ends of said springs are respectively attached to arms 80 and bearings 78. Said springs 83 act to move arms 80 upwardly, as seen in Fig. 7. It will be seen that when disk 66 is rotated, arms 80 will be oscillated and bars 82 will be oscillated between the position shown in full lines in Fig. 7 and the position shown in dotted lines therein. Receptacle 54 is removable through the bottom of casing 30. The top of casing 54 can be closed by a flexible cover 54g which has a handle 54h secured thereto. Cover 54g will slide in guideways 54i at the sides of said receptacle 54 and can be readily moved from the position shown in Fig. 10 to its open position. In the latter position, cover 54g is disposed in a chamber 54j in the bottom of receptacle 54, as shown in Fig. 7.

The drum 36 carrying the film roll 34a is disposed in a film magazine comprising a casing or cabinet 85 shown in Fig. 3. Casing 30 has at one end a chamber 30c having spaced supports 86 secured to the bottom 75 thereof. The outer members 86 have recesses 86a at their bottoms and at the outer sides thereof. Casing 85 is provided with supporting members 85a shown as angular in form with inwardly extending flanges 85a1. These flanges 85a1 slide under the outermost members 86 in the recesses 86a, as seen in Fig. 4. Casing 85 also has another member 89 disposed centrally thereof and of inverted channel form, the sides of which engage the sides of the central member 86. Latches 87 are provided for holding casing 85 in position in casing 30. Casing 85 has a rear member hinged at one end of said casing by a hinge 88. Said rear member can thus be lifted so that the roll of film 34a can be placed in said casing at the rear thereof. Casing 85 also has a rib 85c extending along and projecting upwardly from one end thereof. Cover 31 of casing 30 has a slot 31b formed therein and positioned so that when cover 31 is closed the upper portion of rib 85c will be disposed in slot 31b and form a light seal. Preferably a member 89 of yielding material, such as felt or rubber, which receives a portion of rib 85c is disposed in slot 31b. Drum 36 has end portions 36a with axial openings therein adapted to receive supporting shafts 90 which support drum 36. Shafts 90 have collars 91 thereon which limit the movement of shafts 90 in the openings in the end portions 36a and have splines 90a thereon. Shafts 90 have handle portions 90b at their outer ends and said shafts can be drawn outwardly by said handles. When the shafts are in inner roll-supporting position they are held in this position by hook-like latches 92 hinges to portions 90b and adapted to hook over the peripheral flanges of members 94 journaled in bearings 93. Members 94 are splined to shafts 90 and rotate therewith. It will be seen that casing 85 can be easily moved into position in casing 30. One pin 90 has secured thereto a key 98 fitting in a corresponding key slot in the end 36a of drum 36. Said shaft 90 has splined thereto a pulley 100 over which runs a belt 101 also running over a pulley 102 secured to shaft 40. Shafts 90 are slidable longitudinally for removing drum 36.

The film 34 is dispensed through a passage formed by a portion 85d of casing 85 and by a plate forming part of top member 85e. A member 104 is disposed in a channel formed by angular plates 105 secured to top 85b and forms part of the light seal. A plate 106 is movable vertically in a channel 108, the same having an opening into which extends the end of an arm 109 secured to a shaft 110 journaled in casing 85. Shaft 110 also has secured thereto an arm 107 extending at an angle to arm 109 and disposed at the outer side of casing 85 at one end thereof. Shaft 110 has arms 111 secured thereto and springs 112 have one of their ends secured to arms 111 respectively and their lower ends secured to brackets 114 in casing 85. Cover 31 is provided at one side with plates 116 in which are formed slots 116a. A plurality of spaced arms 117 are oscillatably mounted on bolt-like pivots 118, said arms being pivotally connected by pivots 119 to a bar 120. Bar 120 is pivoted by a pivot 122 to one end of one arm of a bell crank lever 125. The other and longer arm of lever 125 is provided with a handle portion 125a. A stop member 126 limits the movement of lever 125 in one direction. The arms 117 are provided with pins 127 adapted to move into the slots 116a when cover 31 is in closed position and lock said cover in said position. Lever 125 is secured to its fulcrum shaft 115 which is journaled in one side of casing 30 and said shaft has secured to its other end an arm 121 having projecting inwardly of casing 30 a pin 123, as seen in Fig. 2.

Casing 30 has gaskets 130 secured to three sides thereof adapted to be engaged by portions of casing 85 when the latter is in position in casing 30. Casing 30 has an arm 132 pivoted thereto at one side adapted to form a prop for holding cover 31 in raised position.

As above stated, shaft 40 is connected to continuously rotating drum 42 to move the film 34 and is disconnected from said drum 42 and abruptly stopped by engagement with a brake. One portion of shaft 40 is journaled in bearings 134, shown as ball bearings, supported in a bracket 135 secured to a plate 136 in turn secured to plate 71 by bolts 137. A disk-like member 138 is secured to shaft 40 in any suitable manner, as by the key 140. Member 138 has projecting therefrom a pin 141 which extends through an arcuate slot 142a formed in a disk-like member 142 journaled in bearings 144 illustrated as ball bearings, and which are supported on shaft 40. A tensile coiled spring 145 is secured at one end to pin 141 and at its other end to a pin 146 secured to member 142. Another member 148 has a central portion journaled in bearings 149 shown as ball bearings, and supported on shaft 40. Bearings 149 are spaced from bearings 144 by a collar 150. Member 148 has arms 148a projecting in opposite directions therefrom and pins 152 are carried in the outer ends of said arms and project therefrom toward member 142. Each pin 152 has journaled thereon a shoe 153. Shoes 153 have curved surfaces adapted to engage the cylindrical periphery of the hub of member 142. Said surfaces are somewhat eccentric to the axes of pins 152. Shoes 153 are also connected to arms 148a by torsion springs 154. One end of each spring 154 is connected to a shoe 153 and the other end is connected to one of the arms 148a. Pins 152 are threaded at one end and equipped with nuts 156 engaging one side of the arms 148a. A collar 157 is secured to shaft 40 beyond member 148 by a set screw 158. Member 148 also has an arm 148b, the outer end of which is adapted to move between spaced stationary stop members 159 and 161 secured to plate 71. Arm 148b has secured thereto by spaced screws 160 an arm 148c having a projecting tongue 148d with an outer convex surface substantially concentric with the axis of shaft 40. Arm 148c also has a flat surface 148e adapted to strike a roller 164 rotatably carried on an arm 165 forming the operating arm for a switch 166. While switch 166 may be of various types, in practice a micro-switch has been found suitable. A weight 167 is attached to arm 165.

Casing 30 has recesses 30e at each side thereof somewhat adjacent its ends, and supporting wheels 168 are disposed in said recesses and carried on shafts 169. Wheels 168 have grooves in their periphery and are constructed to run on tracks formed by bars 170. A counter 172 is supported at one side of casing 30 which is arranged to count the exposures made.

In Fig. 17 a wiring diagram for the device is illustrated. As above stated, a motor 46 is provided for driving belt 43 and drum 42. This motor is shown in the diagram and a conductor 176 leads to the switch 177 for controlling said motor. The input conductors are shown as 178 and 180. A conductor 181 extends from conductor 178 to motor 46. A conductor 182 extends from one contact 177a to conductor 180. Another conductor 184 extends from contact 177b of switch 177 to a contact 185a of a relay 185. Another contact 185b which is normally engaged by contact 185a is shown, and contacts 185a and 185b will be separated when relay 185 is energized. A conductor 186 extends from contact 185b to conductor 180. Conductor 180 extends to a contact 185c of relay 185 which is normally separated from another contact 185d of relay 185. Contacts 185c and 185d are brought into engagement when relay 185 is energized. A conductor 188 extends from contact 185d to a coil of relay 185 and a conductor 189 extends from said coil to switch 166. Conductor 178 extends to switch 166. A conductor 190 extends from a contact 177c of switch 177 to a contact 194a of a relay 194 which is in the conductor 195 forming a part of the operating circuit of the X-ray apparatus. Contact 194a is normally separated from a contact 194b of relay 194 but is brought into engagement with contact 194b when relay 194 is energized. A conductor 195 extends from contact 194b to one end of the coil of a relay 196. The other end of said coil is connected to a conductor 197 which extends to conductor 178. A solenoid 200 is connected to conductor 195 by a conductor 201 and said solenoid is also connected by a conductor 202 to conductor 178. A conductor 204 extends from conductor 184 to a contact 196a of relay 196. Contact 196a is normally separated from an adjacent contact 196b but is brought into engagement with contact 196b when relay 196 in energized. A conductor 205 extends from contact 196b to a contact 196c of relay 196. Another contact 196d of relay 196 is normally in engagement with contact 196c but is separated therefrom when relay 196 is energized. A conductor 206 extends from contact 196d to one end of the coil of a solenoid 208. The other end of said coil is connected by a conductor 209 to conductor 189. A conductor 210 extends from conductor 188 to conductor 205 at a point between the pairs of contacts 196a, 196b and 196c, 196d.

The operation of the device is as follows. Assuming that an exposure period is in progress, the film 34 will be held in stationary position by clamping means, as fully described in said prior application. During exposure, relay 194 will be energized. This will engage contacts 194a and 194b. The switch 177 will be closed. A circuit is now closed from conductor 180, through conductor 186, through the engaged contacts 185a and 185b, through conductor 184 and switch contacts 177b and 177c, through contacts 194a and 194b now in engagement, and through relay 196 to conductor 178. Current will also flow from conductor 195, through conductor 201, through the coil relay of solenoid 200 and through conductor 202 to conductor 178. Solenoid 200 is now energized. Relay 196 will be energized. This separates contacts 196c and 196d and engages contacts 196a and 196b. A circuit is now closed through conductor 180, through conductor 186, through contacts 185a and 185b, through conductor 204, through contacts 196a and 196b now in engagement, through conductor 210, through conductor 188, through the coil of relay 185 and through switch 166 to conductor 178. This energizes relay 185 so that contacts 185c and 185d are engaged and thereafter contacts 185a and 185b are disengaged. A circuit is now closed through conductor 180, contacts 185c and 185d, through conductor 188, through the coil of relay 185 and through switch 166 to conductor 178. This latter circuit forms a holding circuit for relay 185. With solenoid 200 energized, shaft 40 is held in stationary position by the brake in drum 42.

When the exposure period is completed, the circuit through conductor 195 is broken and relay 194 is deenergized. Contacts 194a and 194b are now separated. This immediately deenergizes solenoid 200 and shaft 40 is connected to drum 42 by the clutch. Relay 196 is likewise deenergized and contacts 196a and 196b are disengaged and contacts 196c and 196d are engaged. A circuit is now closed through conductor 180, contacts 185c and 185d, conductor 210, contacts 196c and 196d and through the coil of solenoid 208. When solenoid 208 is energized, the clamping means for the film is withdrawn. Shaft 40 now being rotated by drum 42 rotates the wheels 38 and the film is moved by the pointed projections 39. When the exposed portion of the film is moved the proper distance to bring a new or unexposed portion of film below plate 31a, the exposed portion of the film is severed, as set forth in said prior application, and the same is guided to rollers 55 and 56 and moved into receptacle 54. A cycle of movement of shaft 40 and thus movement of the film takes place in one revolution of shaft 40. Shaft 40 is then unclutched from drum 42 and is held stationary by the brake. Shaft 40 is abruptly stopped and member 142 which has been rotated by pin 141 continues to rotate or overrun. It can do this until the end of slot 142a engages pin 141 which is now stationary with member 138 and shaft 40. The shoes 153 during rotation of members 138 and 142 and during said overrun merely drag by pressure of springs 154 on the periphery of the hub on member 142 and arm 148b is moved against stop 159. When member 142 overruns and the end of slot 142a engages pin 141, spring 145 has been extended and it then rotates member 142 in the opposite direction until arm 148b engages stop 161. In this rotation shoes 153 grip the periphery of the hub of member 142 and arm 148b is rotated in a clockwise direction as seen in Figs. 13 and 15. This clockwise movement only continues until arm 148b engages stop 159. During said clockwise rotation of arm 148c, portion 148d moves along roller 164 and the surface 148e strikes roller 164 with a sharp blow. This contact or blow moves roller 164 and arm 165 very quickly to the position shown in dotted lines in Fig. 15. This movement momentarily opens switch 166. Weight 167 is used to add mass so as to have sufficient inertia to operate switch 166. The opening of switch 166 breaks the circuit through relay 185, contacts 185a and 185b are closed, and contacts 185c and 185d are separated. The circuit through relay 185 is broken as is also the circuit through solenoid 208. As stated, solenoid 208 when energized removes the clamping means from the film and thus when it is deenergized the film is again clamped and held in stationary position. All parts have now been brought to their original positions and another exposure period commences. Switch 166 is quickly returned to its normal position by a spring forming part of the switch. Belt 43 is preferably a toothed belt, as shown. This type of belt is used since belt 43 runs over a rather small motor pulley.

When the cover 31 is closed, lever 125 is moved by its handle 125a and arms 117 are swung and the said cover is locked in closed position by the members 127. This movement of lever 125 oscillates shaft 119. Oscillation of shaft 119, as seen in Fig. 4, oscillates the arm 121. Oscillation of arm 121 moves pin 123 against arm 107 and said latter arm is oscillated. Oscillation of arm 107 oscillates shaft 110 and this moves arm 109 in a counter-clockwise direction, as seen in Fig. 5. This movement of arm 109 moves the plate 106 and the light seal formed by said plate is opened. Said light seal is closed when the roll of film and casing 85 are to be removed. When cover 31 is unlocked and raised, springs 112, only one of which is shown, immediately oscillate shaft 110 and member 106 is moved upward, as seen in Fig. 5, against the yielding member 104 and the light seal is closed. The roll of film is rotated through belt 101 so that undue strain will not be placed on said film.

When the severed film is moved into receptacle 54, it moves into position above the inclined portion 54c of the receptacle walls. As shaft 40 rotates, member 66 rotates and moves roller 68 downwardly. This moves bar 72 upwardly and the adjacent ends of arms 74 are moved upwardly. This swings shafts 76 and 77 and the arms 80 together with bars 82 are moved downwardly to the dotted line position shown in Fig. 7. The end portions of the severed film are thus depressed or pushed downwardly and they move below the ledges formed by the portions 54e of the receptacle walls. When the arms 80 move upwardly, the film moves or snaps back and it is held below said ledges, as shown in Fig. 7. The films are also bent over the member 65 and this acts to counteract the tendency of the film to roll up. When the receptacle 54 is to be removed, the cover 54g is moved to closed position, as shown in Fig. 10.

From the above description it will be seen that the present invention comprises quite a number of improvements on the device disclosed in said prior application. The drawings and disclosure in this application have been limited to the improvements. It is thought the operation of the device will be entirely clear with reference to the device of the prior application.

The device comprises a very compact unit and one which will be of high utility in hospitals and other medical institutions. The X-ray films can be taken with great rapidity and can be handled with great convenience.

It will of course be understood that various changes may be made in the form, details, arrangement and proportions of the parts, without departing from the scope of applicants' invention, which, generally stated, consists in a device capable of carrying out the objects above set forth, in the parts and combinations of parts disclosed and defined in the appended claims.

What is claimed is:

1. A machine used in connection with an X-ray apparatus for rapidly making X-ray films having in combination, a relay which is energized during the exposure period by current from a conductor forming part of said X-ray apparatus, a pair of contacts on said relay which are engaged when said relay is energized, means for moving a continuous strip of film between exposure periods to present a portion of unexposed film to said apparatus including a rotatable shaft, a second means for stopping said rotation of said shaft during said exposure period for rendering said means inoperative during the exposure period, and an electrical circuit closed by engagement of said pair of contacts for actuating said last mentioned means.

2. The structure set forth in claim 1, a second relay energized when said circuit is closed during said exposure period, a third means for clamping said continuous film in stationary position during the exposure period, a fourth means for releasing said clamping means including a solenoid, and a fifth means acting to energize said solenoid and render inoperative said third means when said second relay is deenregized at the termination of said exposure 3. A machine used in connection with an X-ray apparatus for rapidly making X-ray films having in combination, means for moving a continuous film between exposure periods to present an unexposed portion of said film including a rotating shaft, a second means for restraining movement of said continuous film during exposure periods, a third means for rendering said second means inoperative including a solenoid, an electrical circuit including said solenoid, a switch for opening said circuit, means carried on said shaft for stopping rotation of said shaft when said unexposed portion of said film is in proper position, and a member journaled on said shaft adapted to overrun when said shaft is stopped, means for moving said member in a direction opposite to said overrun, and means operated by said member and having a portion when moving in said latter direction for operating said switch.

4. The structure set forth in claim 1, a second relay energized when said circuit is closed, a third means for clamping said continuous film in stationary position during the exposure period, a fourth means for releasing said clamping means including a solenoid, a pair of normally engaged contacts and a pair of normally disengaged contacts controlled by said second relay and respectively engaged and disengaged when said second relay is energized and an electrical circuit closed by said normally engaged contacts when said relays are deenergized at the end of said exposure period for energizing said solenoid whereby said fourth means is actuated and said film released at the end of said exposure period.

5. A machine used in connection with an X-ray apparatus for rapidly making X-ray films having in combination, means for moving a continuous film between exposure periods to present an unexposed portion of said film including a rotating shaft, a second means for clamping said film in position during exposure periods, a third means for rendering said second means inoperative including a solenoid, an electrical circuit including said solenoid, a switch for opening said circuit, means for abruptly stopping rotation of said shaft when said unexposed portion of said film is in proper position, a member journaled on said shaft which overruns when rotation of said shaft is stopped, means operated by said member having a portion for striking said switch and opening said switch to deenergize said solenoid and render inoperative said second means.

6. A machine used in connection with an X-ray apparatus for rapidly making X-ray films having in combination, a shaft arranged to be rotated, means for abruptly stopping said rotation, a switch, said switch having a portion adapted to be moved for operating said switch, a member journaled on said shaft, means for connecting said member to said shaft to be rotated with said shaft, said member being adapted to overrun when said rotation is stopped, a second member having a part adapted to strike said portion of said switch and operate said switch, means for moving said first mentioned member in the opposite direction after said overrun, and means for connecting said second member to said first mentioned member during said latter movement for causing said part to strike and operate said switch.

7. The structure set forth in claim 6, means for quickly returning said switch to normal position after being struck and operated by said portion.

8. A machine used in connection with an X-ray apparatus for rapidly making X-ray films having in combination, means for intermittingly moving a film strip including a rotatable shaft, means for suddenly stopping the rotation of said shaft, a member rotated from said shaft and adapted to overrun when said shaft is stopped, means for rotating said member in a direction opposite to said overrun after said overrun, a switch having a portion movable to operate said switch, and a second member movable by said last mentioned means adapted to strike said portion and operate said switch.

9. The structure set forth in claim 8, and means for returning said switch to normal position.

10. The structure set forth in claim 8, and means for connecting said second member to said first mentioned member to actuate said second member.

11. A machine used in connection with an X-ray apparatus for rapidly making X-ray films having in combination, a shaft arranged to be rotated, means for abruptly stopping said rotation, a member journaled on said shaft, means for connecting said member to said shaft to be rotated with said shaft, said member having a cylindrical surface thereon, a second member journaled on said shaft having circumferentially spaced arms, a shoe for each of said arms, pivots respectively connecting said shoes to said arms, said shoes having curved surfaces adapted repectively to engage said cylindrical surface and be moved by said surface to rotate said second member.

12. The structure set forth in claim 11, said surfaces of said shoes being respectively eccentric to the axes of their pivots, a switch having a portion adapted to be moved for operating said switch, said member being adapted to overrun when rotation of said shaft is stopped, means for moving said member in the opposite direction to said overrun causing said shoes to grip said cylindrical surface and move said second member, said second member having means to strike said portion of said switch and operate said switch.

13. A machine used in connection with an X-ray apparatus for rapidly making X-ray films having in combination, means for intermittently moving a film strip including a rotatable shaft, means for stopping the rotation of said shaft, a member rotated from said shaft and adapted to overrun when said shaft is stopped, means for rotating said member in a direction opposite to said overrun after said overrun, a switch having a portion movable to operate said switch, a second oscillating member having an arm for striking said portion to operate said switch, and means for frictionally connecting said second member to said first mentioned member during said opposite rotation of said first mentioned member to actuate said second member to operate said switch.

14. A machine used in connection with an X-ray apparatus for rapidly making X-ray films having a continuous film, portions of which are successively disposed for exposure having in combination, intermittently acting means for progressing said film, a receptacle adapted to receive a severed portion of said film and having ledges adjacent opposite portions thereof respectively, means for moving said portion of film into said receptacle above said ledges, and means for depressing opposite edge portions of said films respectively so that they are moved under said ledges.

15. The structure set forth in claim 14, and a member having a top portion positioned above the bottom of said receptacle over which the films are successively bent as said end portions of said films are depressed.

16. The structure set forth in claim 15, said top portion having a rounded convex surface.

17. A machine used in connection with an X-ray apparatus for rapidly making X-ray films having a continuous film, portions of which are successively disposed for exposure having in combination, intermittently acting means for progressing said film, means for severing the exposed portion of said film, a receptacle adapted to receive said severed portion, means for moving said portion into said receptacle adjacent the top of the same, a pair of bars extending transversely of said container adjacent its ends and above said portion, a pair of arms secured to each of said bars, a pair of spaced oscillating shafts extending parallel to said bars, said pairs of arms being respectively connected to said shafts, a second pair of arms the ends of which are secured respectively to said shafts, a pivot connecting the other ends of said latter arms, one of said arms being movable relatively to said pivot, and means for moving said pivot vertically whereby said first mentioned arms and said bars are moved substantially vertically.

18. The structure set forth in claim 17, said last mentioned means comprising a lever having one end connected to said pivot and a rotating means engaging a member carried by the other end of said lever for oscillating said lever and moving said first mentioned pivot.

19. A machine used in connection with an X-ray apparatus for rapidly making X-ray films having a continuous film, portions of which are successively disposed for exposure having in combination, intermittently acting means for progressing said film, means for severing the exposed portion of said film, a receptacle into which said severed portions are moved, said receptacle having opposite walls, said walls having substantially horizontal inwardly extending surfaces, second surfaces extending inwardly and downwardly from the outer ends of said surfaces, and third substantially horizontal surfaces extending outwardly below said latter surfaces and forming ledges whereby films received between said first two pairs of surfaces may have their ends pushed downwardly along said second surfaces to below said third surfaces so that said ends will snap to position below said ledges.

20. A machine used in connection with an X-ray apparatus for rapidly making X-ray films having in combination, a casing having a chamber adjacent one end thereof, a second casing receivable in said chamber, a second chamber in said second casing adapted to receive a roll of film and having an opening therein through which said film is dispensed, a light seal for said opening, a cover for said first mentioned casing and chamber, means associated with said second casing responsive to the closing of said cover to move said light seal to inoperative position away from said opening and said means automatically moving said light seal to operative position to seal said opening when said cover is opened.

References Cited in the file of this patent

UNITED STATES PATENTS

| | | |
|---|---|---|
| 2,166,440 | Jones | July 18, 1939 |
| 2,391,191 | Powers | Dec. 18, 1945 |
| 2,831,979 | Kallenberg et al. | Apr. 22, 1958 |

FOREIGN PATENTS

| | | |
|---|---|---|
| 704,583 | Great Britain | Feb. 24, 1954 |
| 722,443 | Great Britain | Jan. 26, 1955 |